(12) United States Patent
Cheong et al.

(10) Patent No.: US 9,847,799 B2
(45) Date of Patent: Dec. 19, 2017

(54) METHOD OF PROVIDING COMMUNICATION SERVICE AND APPARATUS FOR PERFORMING THE METHOD

(71) Applicant: ELECTRONICS AND TELECOMMUNICATIONS RESEARCH INSTITUTE, Daejeon (KR)

(72) Inventors: Min Ho Cheong, Daejeon (KR); Hyoung Jin Kwon, Sejong (KR); Sok Kyu Lee, Daejeon (KR); Jae Seung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/132,034

(22) Filed: Apr. 18, 2016

(65) Prior Publication Data
US 2016/0308561 A1    Oct. 20, 2016

(30) Foreign Application Priority Data
Apr. 20, 2015  (KR) ......................... 10-2015-0055372

(51) Int. Cl.
| | |
|---|---|
| *H04B 15/00* | (2006.01) |
| *H04B 1/10* | (2006.01) |
| *H04W 8/18* | (2009.01) |
| *H04B 1/04* | (2006.01) |

(Continued)

(52) U.S. Cl.
CPC ............ *H04B 1/0475* (2013.01); *H04W 4/08* (2013.01); *H04W 72/082* (2013.01)

(58) Field of Classification Search
CPC ....... C23C 16/04; C23C 16/403; C23C 16/06; C23C 16/405; C23C 16/308; C23C 16/303; C23C 16/36; C23C 16/402; H01L 21/67103; H01L 21/67207; H04B 1/10; H04B 15/00; H04W 4/08; H04W 8/186;
(Continued)

(56) References Cited

U.S. PATENT DOCUMENTS

| | | | | |
|---|---|---|---|---|
| 7,826,845 | B2 * | 11/2010 | Chen ................... | H04W 76/027 455/432.1 |
| 2006/0094372 | A1 * | 5/2006 | Ahn ....................... | H04L 1/0003 455/67.13 |

(Continued)

FOREIGN PATENT DOCUMENTS

EP    1887709 A1 *   2/2008

*Primary Examiner* — Andrew Wendell

(57) ABSTRACT

Disclosed is a method of providing a communication service and an apparatus for performing the method, in which the method includes determining a first user group including a selected user terminal to which a communication service is provided by a communication device belonging to a cell coverage area, determining a second user group including at least one candidate user terminal selected from a plurality of candidate user terminals based on interference information affecting the selected user terminal, and determining the first user group and the second user group to be a final user group to which the communication service is to be provided by the communication device.

6 Claims, 11 Drawing Sheets

(51) Int. Cl.
*H04W 4/08* (2009.01)
*H04W 72/08* (2009.01)

(58) Field of Classification Search
CPC . H04W 72/121; H04W 28/048; H04W 36/20; H04W 40/16; H04W 72/082
See application file for complete search history.

(56) References Cited

U.S. PATENT DOCUMENTS

| | | | |
|---|---|---|---|
| 2007/0066232 A1* | 3/2007 | Black | H04L 5/0007 455/67.11 |
| 2010/0265813 A1* | 10/2010 | Pereira | H04W 28/0231 370/201 |
| 2013/0188571 A1 | 7/2013 | Cheong et al. | |
| 2013/0267266 A1 | 10/2013 | Park et al. | |
| 2014/0220970 A1* | 8/2014 | Yang | H04W 48/20 455/434 |
| 2014/0274088 A1* | 9/2014 | Talwar | H04J 11/0023 455/452.1 |
| 2015/0156794 A1* | 6/2015 | Kwon | H04W 72/1231 370/329 |
| 2015/0305062 A1* | 10/2015 | Sung | H04W 74/002 370/329 |

\* cited by examiner

FIG. 8

Result: $\{S_k\}_{k\in[1:M]}$
Initialization:
for $k = [1:M]$ do
  | set $S_k = A_k$;
end
if $\cup_{k=1}^{M} S_k = \emptyset$ and $\cup_{k=1}^{M} B_k \neq \emptyset$ then
  | set $(l^*, j^*) = \arg\max_{k\in[1:M], i\in B_k} \|g_{k,i}^{(k)}\|$;
  | update $S_{l^*} = S_{l^*} \cup \{\text{candidate } (l^*, j^*)\}$ and $B_{l^*} = B_{l^*} \setminus \{\text{candidate } (l^*, j^*)\}$;
  | for $k = [1:M]$ do
  |   | set $h_{l^*, j^*}^{(k)} = g_{l^*, j^*}^{(k)}$;
  | end
else
  | return $\{S_k\}_{k\in[1:M]}$;
end
Serving User Update:
set flag = true;
while flag = true do
  | for $l \in [1:M]$ do
  |   | if $S_l < N$ then
  |   |   | set $\delta_{l,j} = \sum_{k=1}^{M} \sum_{i\in S_k} |\theta_{l,j}^{(k,i)}|$ for all $j \in B_l$;
  |   | else
  |   |   | set $\delta_{l,j} = 2\epsilon$ for all $j \in B_l$;
  |   | end
  | end
  | set $(l^*, j^*) = \arg\min_{l\in[1:M], j\in B_l} \delta_j^{(l)}$;
  | if $\delta_{l^*, j^*} \leq \epsilon$ then
  |   | update $S_{l^*} = S_{l^*} \cup \{\text{candidate } (l^*, j^*)\}$ and $B_{l^*} = B_{l^*} \setminus \{\text{candidate } (l^*, j^*)\}$;
  |   | for $k = [1:M]$ do
  |   |   | set $h_{l^*, j^*}^{(k)} = g_{l^*, j^*}^{(k)}$;
  |   | end
  | else
  |   | set flag = false
  | end
end
return $\{S_k\}_{k\in[1:M]}$;

FIG. 9

```
Result: {S_k}_{k∈[1:M]}
Initialization:
for k = [1 : M] do
    set S_k = A_k;
end
if ∪_{k=1}^{M} S_k = ∅ and ∪_{k=1}^{M} B_k ≠ ∅ then
    set (l*, j*, q*) = arg max_{k∈[1:M], j∈B_k, q∈[1:Q]} ||G_{k,j}^{(k)} v(q)||;
    update S_{l*} = S_{l*} ∪ {candidate (l*, j*)} and B_{l*} = B_{l*} \ {candidate (l*, j*)};
    for k = [1 : M] do
        set H_{l*,j*}^{(k)} = G_{l*,j*}^{(k)} and v_{l*,j*}^{(k)} = v(q*);
    end
else
    return {S_k}_{k∈[1:M]} and {V_k}_{k∈[1:M]};
end
Serving User Update:
set flag = true;
while flag = true do
    for l ∈ [1 : M] do
        if S_l < N then
            set δ_{l,j}(q) = ∑_{k=1}^{M} ∑_{i∈S_k} |θ_{i,j}^{(k,l)}(q)| for all j ∈ B_l and q ∈ [1 : Q];
        else
            set δ_{l,j}(q) = 2ε for all j ∈ B_l and q ∈ [1 : Q];
        end
    end
    set (l*, j*, q*) = arg min_{l∈[1:M], j∈B_l, q∈[1:Q]} δ_j^{(l)}(q);
    if δ_{l*,j*}(q*) ≤ ε then
        update S_{l*} = S_{l*} ∪ {candidate (l*, j*)} and B_{l*} = B_{l*} \ {candidate (l*, j*)}
        for k = [1 : M] do
            set H_{l*,j*}^{(k)} = G_{l*,j*}^{(k)} and v_{l*,j*}^{(k)} = v(q*);
        end
    else
        set flag = false
    end
end
return {S_k}_{k∈[1:M]};
```

METHOD OF PROVIDING COMMUNICATION SERVICE AND APPARATUS FOR PERFORMING THE METHOD

CROSS-REFERENCE TO RELATED APPLICATION

This application claims the priority benefit of Korean Patent Application No. 10-2015-0055372, filed on Apr. 20, 2015, in the Korean Intellectual Property Office, the disclosure of which is incorporated herein by reference.

BACKGROUND

1. Field of the Invention

The present invention relates to a method of providing a communication service and a control apparatus, and more particularly, to a method and an apparatus for effectively updating a selected user group to which a communication service is to be provided by a communication device.

2. Description of the Related Art

Opportunistic interference alignment (OIA) refers to a method of selecting a new user terminal in each transmission slot based on a channel state and transmitting a message to the user terminal. The user terminal may be connected to a communication device in order for the message to be transmitted to the user terminal.

When the user terminal is connected to the communication device, the user terminal may then perform communication by sequentially occupying transmission slots. When the message is transmitted, the user terminal may return the occupied transmission slot for communication. The user terminal may return a wireless resource after performing a communication service.

Here, when a new user terminal is determined in each transmission slot for a communication service, a calculation complexity may increase in proportion to a number of user terminals. Thus, there is a desire for a method of solving such an increasing complexity.

SUMMARY

An aspect of the present invention provides a method and an apparatus for reducing a calculation complexity in determining a selected user terminal by partially updating a new selected user terminal to which a communication service is to be provided by a communication device in each transmission slot.

Another aspect of the present invention also provides a method and an apparatus for achieving a high transmission sum rate in a high signal-to-noise ratio (SNR) region by maintaining a predetermined number of selected user terminals to be finally determined in association with a communication device.

Still another aspect of the present invention also provides a method and an apparatus for maintaining a quality of a communication service by updating, to be a selected user terminal, candidate user terminals having a lower degree of interference with a selected user terminal receiving the communication service from a communication device than a reference value.

According to an aspect of the present invention, there is provided a method of providing a communication service performed by a control apparatus, the method including determining a first user group including a selected user terminal to which a communication service is provided by a communication device belonging to a cell coverage area, determining a second user group including at least one candidate user terminal selected from a plurality of candidate user terminals based on interference information affecting the selected user terminal, and determining the first user group and the second user group to be a final user group to which the communication service is to be provided by the communication device.

The interference information may be determined based on channel information between the candidate user terminal and the communication device and channel information between the selected user terminal and the communication device.

When the candidate user terminal has a single transmitting antenna, the interference information may be determined based on an angle between a channel vector from the candidate user terminal to the communication device and a channel vector from the selected user terminal to the communication device.

When the candidate user terminal has multiple transmitting antennas, the interference information may be determined based on an angle between a channel vector from the candidate user terminal to the communication vector, for each transmitting antenna of the candidate user terminal, and a channel vector from the selected user terminal to the communication device.

The determining of the second user group may include determining the second user group allowing the interference information to be less than preset reference information and the final user group to maintain terminals less than or equal to a preset number of terminals.

According to another aspect of the present invention, there is provided a method of providing a communication service performed by a control apparatus, the method including determining overall interference information associated with a plurality of communication devices belonging to a cell coverage area, updating a selected user terminal to which a communication service is to be provided by each communication device based on the overall interference information, and notifying the communication devices of the updated selected user terminal.

The overall interference information may be determined based on interference information partially updated by each communication device belonging to the cell coverage area.

A k-th communication device among the communication devices may update interference information associated with the k-th communication device onto interference information associated with a k−1th communication device and transmit the updated interference information to a k+1th communication device.

The interference information associated with the k-th communication device may be determined based on channel information between a candidate user terminal associated with the k-th communication device and the k-th communication device, and channel information between a selected user terminal associated with the k-th communication device and the k-th communication device.

According to still another aspect of the present invention, there is provided a method of providing a communication service performed by a control apparatus, the method including determining a selected user terminal terminating a communication service provided by a communication device belonging to a cell coverage area and returning a network resource, selecting at least one candidate user terminal from a plurality of candidate user terminals based on interference information affecting the selected user terminal, and updating the selected candidate user terminal, excluding the selected user terminal from a final user group to which the communication service is to be provided by the communication device.

According to yet another aspect of the present invention, there is provided a method of providing a communication service performed by a control apparatus, the method including determining interference information of each candidate user terminal desiring to receive a communication service from a communication device belonging to a cell coverage area, affecting selected user terminals receiving the communication service, and determining whether to convert a candidate user terminal to a selected user terminal based on the interference information of candidate user terminals.

According to further another aspect of the present invention, there is provided a control apparatus performing a method of providing a communication service, the control apparatus including a first determiner configured to determine a first user group including a selected user terminal to which a communication service is provided by a communication device belonging to a cell coverage area, a second determiner configured to determine a second user group including at least one candidate user terminal selected from a plurality of candidate user terminals based on interference information affecting the selected user terminal, and a third determiner configured to determine the first user group and the second user group to be a final user group to which the communication service is to be provided by the communication device.

The interference information may be determined based on channel information between the candidate user terminal and the communication device, and channel information between the selected user terminal and the communication device.

When the candidate user terminal has a single transmitting antenna, the interference information may be determined based on an angle between a channel vector from the candidate user terminal to the communication device and a channel vector from the selected user terminal to the communication device.

When the candidate user terminal has multiple transmitting antennas, the interference information may be determined based on an angle between a channel vector from the candidate user terminal to the communication device, for each transmitting antenna of the candidate user terminal, and a channel vector from the selected user terminal to the communication device.

The second determiner may determine the second user group allowing the interference information to be less than preset reference information and the final user group to maintain terminals less than or equal to a preset number of terminals.

According to still another aspect of the present invention, there is provided a control apparatus performing a method of providing a communication service, the control apparatus including a determiner configured to determine overall interference information associated with a plurality of communication devices belonging to a cell coverage area, an updater configured to update a selected user terminal to which a communication service is to be provided by each communication device based on the overall interference information, and a notifier configured to notify the communication devices of the updated selected user terminal. The overall interference information may be determined based on interference information partially updated by each communication device belonging to the cell coverage area.

A k-th communication device among the communication devices may update interference information associated with the k-th communication device onto interference information associated with a k−1th communication device and transmit the updated interference information to a k+1th communication device.

The interference information associated with the k-th communication device may be determined based on channel information between a candidate user terminal associated with the k-th communication device and the k-th communication device, and channel information between a selected user terminal associated with the k-th communication device and the k-th communication device.

According to still another aspect of the present invention, there is provided a control apparatus performing a method of providing a communication service, the control apparatus including a first determiner configured to determine a selected user terminal terminating a communication service provided by a communication device belonging to a cell coverage area and returning a network resource, a second determiner configured to select at least one candidate user terminal from a plurality of candidate user terminals based on interference information affecting the selected user terminal, and an updater configured to update the selected candidate user terminal, excluding the selected user terminal from a final user group to which the communication service is to be provided by the communication device.

According to still another aspect of the present invention, there is provided a control apparatus performing a method of providing a communication service, the control apparatus including an interference information determiner configured to determine interference information of each candidate user terminal desiring to receive a communication service from a communication device belonging to a cell coverage area, affecting selected user terminals receiving the communication service, and a selected user terminal determiner configured to determine whether to convert a candidate user terminal to a selected user terminal based on the interference information of candidate user terminals.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 is an algorithm illustrating a process of converting a candidate user terminal having a single antenna to a selected user terminal according to an embodiment of the present invention;

FIG. 9 is an algorithm illustrating a process of converting a candidate user terminal having multiple antennas to a selected user terminal according to an embodiment of the present invention;

DETAILED DESCRIPTION

Figure 1:
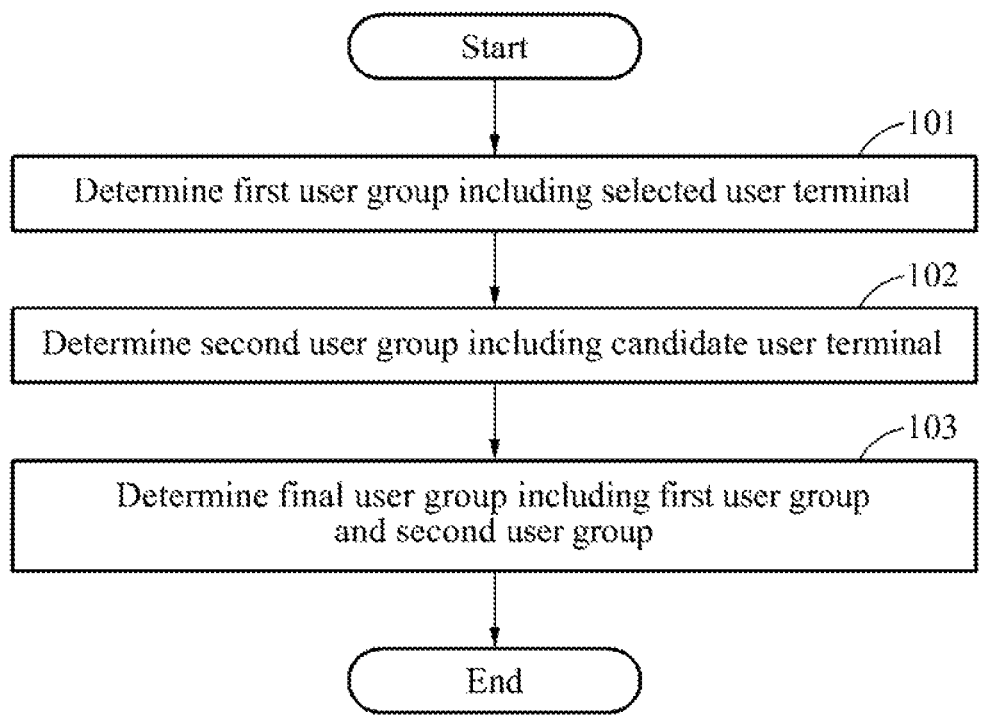
FIG. 1 is a flowchart illustrating a method of providing a communication service according to an embodiment of the present invention.

Reference will now be made in detail to example embodiments of the present invention, examples of which are illustrated in the accompanying drawings, wherein like reference numerals refer to the like elements throughout. Example embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the example embodiments of the present invention and thus may be changed depending on a user, the intent of an operator, or a custom. Accordingly, the terms must be defined based on the following overall description of this specification.

FIG. 1 is a flowchart illustrating a method of providing a communication service according to an embodiment of the present invention.

Referring to FIG. 1, a control apparatus determines a first user group including a selected user terminal. The control apparatus determines the first user group including a user terminal to which a communication service is provided by a communication device belonging to a cell coverage area. The control apparatus may be configured as a processor. The communication device may be an access point to the cell coverage. The control apparatus may be an access point in the cell coverage area, and included in a device autonomously implemented from the communication device or included in the communication device. The selected user terminal may indicate a terminal currently located in the cell coverage area of the communication device and currently receiving the communication service from the communication device.

In operation 102, the control apparatus determines a second user group including a candidate user terminal. In one example, the control apparatus may select, from a plurality of candidate user terminals, at least one candidate user terminal based on interference information about an interference affecting the selected user terminal. The control apparatus may determine the selected at least one candidate user terminal to be the second user group.

The candidate user terminal may indicate a terminal currently located in the cell coverage area of the communication device and currently not receiving the communication service from the communication device. However, the candidate user terminal may be in a situation in which the candidate user terminal may receive the communication service from the communication device. The at least one candidate user terminal determined to be the second user group among the candidate user terminals may receive the communication service from the communication device. However, a candidate user terminal not determined to be the second user group may not receive the communication service from the communication device.

The interference information may be determined based on channel information between the candidate user terminal and the communication device and channel information between the selected user terminal and the communication device. In one example, when the candidate user terminal has a single transmitting antenna, the interference information may be determined based on an angle between a channel vector from the candidate user terminal to the communication device and a channel vector from the selected user terminal to the communication device.

In another example, when the candidate user terminal has multiple transmitting antennas, the interference information may be determined based on an angle between a channel vector from the candidate user terminal to the communication device, for each transmitting antenna of the candidate user terminal, and the channel vector from the selected user terminal to the communication device.

The control apparatus may determine the second user group allowing the interference information to be less than preset reference information and a final user group to maintain terminals to be less than a preset number of terminals.

In operation 103, the control apparatus determines the first user group and the second user group to be the final user group to which the communication service is to be provided by the communication device. The final user group may receive the communication service from the communication device.

The method described with reference to FIG. 1 may indicate opportunistic interference alignment (OIA), and be performed in each transmission slot when the communication device provides the communication service. The first user group may include remaining selected user terminals among a plurality of selected user terminals receiving the communication service from the communication device, excluding a selected user terminal terminating the communication service and returning a transmission slot which is a wireless resource for the communication service. The second user group may include the candidate user terminals desiring to receive the communication service from the communication device, in place of the selected user terminal returning the transmission slot.

An operation of determining a candidate user terminal will be described in detail with reference to FIGS. 2 and 3.

Figure 2:
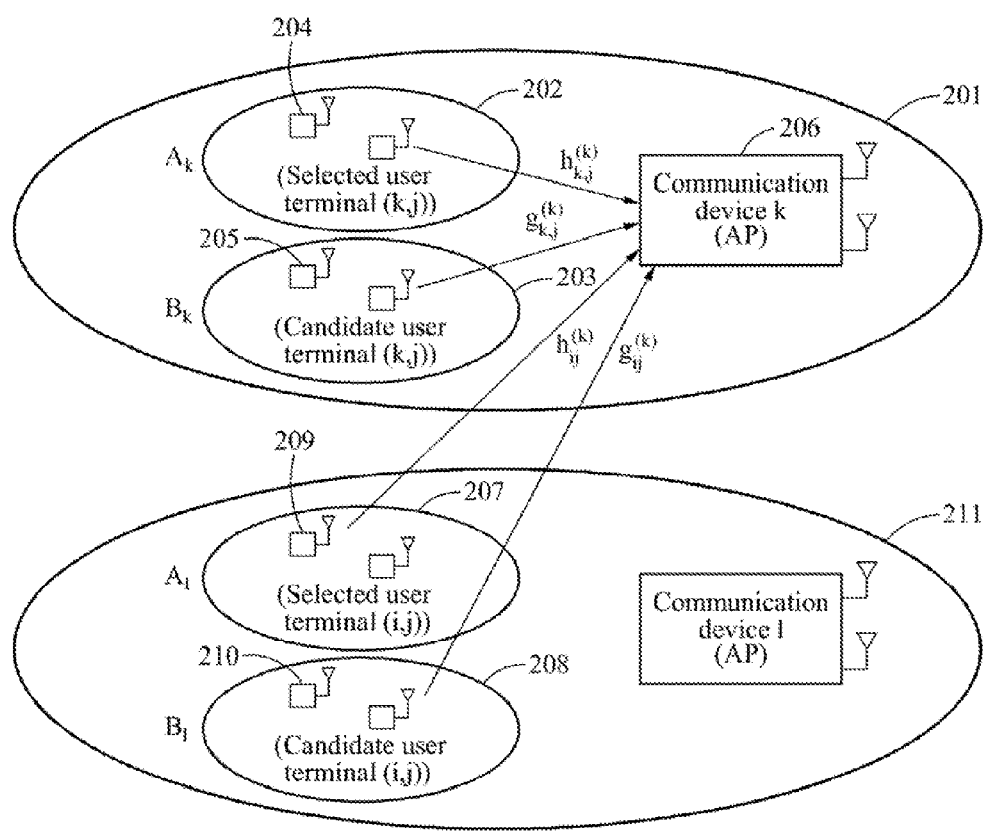
FIG. 2 illustrates an example process of updating a selected user terminal in an environment in which a plurality of cell coverage areas is present according to an embodiment of the present invention.

FIG. 2 illustrates an example process of updating a selected user terminal in an environment in which a plurality of cell coverage areas is present according to an embodiment of the present invention.

FIG. 2 illustrates a cell coverage area 201 of a k-th communication device 206 and a cell coverage area 211 of an l-th communication device. In FIG. 2, a plurality of cell coverage areas is assumed to be present for a plurality of communication devices. In detail, M communication devices are assumed to be present and respective cell coverage areas are assumed to be set by the M communication devices.

Here, a communication device may be an access point (AP). A cell coverage area may correspond to a wireless local area network (WLAN) in which an access point may perform a communication service. An access point may have N receiving antennas. In addition, each user terminal is assumed to have a single transmitting antenna or L transmitting antennas.

In FIG. 2, a user terminal is assumed to have a single transmitting antenna. As described in the foregoing, in each transmission slot, a selected user terminal may terminate a communication service, and a remaining selected user terminal may continuously maintain the communication service.

Referring to FIG. 2, a user group 202 including selected user terminals receiving a communication service from the k-th communication device 206, an AP, at an initiation of a transmission slot is defined as $A_k$. A user group 203 including candidate user terminals requesting the communication service from the k-th communication device 206 at the initiation of the transmission slot is defined as $B_k$. An i-th selected user terminal in the user group 202 is defined as a selected user terminal (k,i) 204, and an i-th candidate user terminal in the user group 203 is defined as a candidate user terminal (k,i) 205.

Similarly, a user terminal included in the cell coverage area 211 which is not the cell coverage area 201 of the k-th communication device 206 may also receive the communication service from the k-th communication device 206. Here, a user group 207 including selected user terminals included in the cell coverage area 211 of the l-th communication device and receiving the communication service from the k-th communication device 206 is defined as $A_l$. A user group 208 including candidate user terminals requesting the k-th communication device 206 for the communication service at the initiation of the transmission slot is defined as $B_l$. An i-th selected user terminal in the user group 207 is defined as a selected user terminal (l,i) 209, and an i-th candidate user terminal is defined as a candidate user terminal (l,i) 210.

The selected user terminal (l,i) 209 in the user group 207 may receive the communication service from the k-th communication device 206 through a current transmission slot. Here, a signal y received by the k-th communication device 206 from the selected user terminal (l,i) 209 in the user group 207 may be determined based on Equation 1.

$$y^{(k)} = \sum_{l=1}^{M} \sum_{j \in A_l} h_{l,j}^{(k)} x_{l,j} + \sum_{l=1}^{M} \sum_{j \in B_l} g_{l,j}^{(k)} \bar{x}_{l,j} + z^{(k)} \quad \text{[Equation 1]}$$

In Equation 1, "$h_{l,j}^{(k)}$" denotes an N×1 channel vector from the selected user terminal (l,j) 209 to the k-th communication device 206. "$g_{l,j}^{(k)}$" denotes an N×1 channel vector from the candidate user terminal (l,j) 210 to the k-th communication device 206. In addition, "$x_{l,j}$" denotes a transmission signal of the selected user terminal (l,j) 209, and "$\bar{x}_{l,j}$" denotes a transmission signal of the candidate user terminal (l,j) 210. "$z^{(k)}$" denotes an N×1 noise vector of the k-th communication device 206.

The k-th communication device 206 is assumed to be only aware of local channel information, for example, $$\{h_{l,j}^{(k)}\}_{l \in [1:M], j \in A_l}$$

and $$\{g_{l,j}^{(k)}\}_{l \in [1:M], j \in B_l}.$$

A selected user terminal and a candidate user terminal are assumed to be unaware of channel information.

According to an example embodiment, a control apparatus may select a candidate user terminal minimizing interference with a selected user terminal to which a communication service is provided by a communication device. Here, when a sum of interference power of a candidate user terminal satisfies a value less than or equal to a reference value, the control apparatus may sequentially register the candidate user terminal in a user group to which the selected user terminal belongs.

Hereinafter, a process of partially updating a selected user terminal and a process of performing OIA will be described.

Channel information associated with the k-th communication device 206 may be expressed as Equation 2.

$$\theta_{l,j}^{(k,i)} = \frac{h_{k,i}^{(k)*} g_{l,j}^{(k)}}{\|h_{k,i}^{(k)}\| \|g_{l,j}^{(k)}\|} \quad \text{[Equation 2]}$$

In Equation 2, "$(\cdot)^*$" and "$\|\cdot\|$" denote a complex conjugate calculation and a norm calculation of a matrix, respectively. Thus, "$\theta_{l,j}^{(k,i)}$" may be interpreted as an angle between a channel from the selected user terminal (k,i) 204 to the k-th communication device 206 and a channel from the candidate user terminal (l,j) 210 to the k-th communication device 206. Based on the angle, a final user group "$\{S_k\}_{k \in [1:M]}$" including selected user terminals to which the communication service is provided by the k-th communication device 206 may be updated.

In an initialization process, the control apparatus may include the selected user group $A_k$ 202 in the final user group $S_k$. Here, when $A_k = \phi$ with respect to $k \in [1:M]$, a candidate user terminal with a highest channel norm may be converted to a first selected user terminal. A subsequent process through which a candidate user terminal is converted to a selected user terminal may be as follows.

A sum of interference power affecting the already selected user terminals by the candidate user terminal (l,j) 210 may be expressed as Equation 3.

$$\theta_{l,j}^{(k,i)} = \frac{h_{k,i}^{(k)*} g_{l,j}^{(k)}}{\|h_{k,i}^{(k)}\| \|g_{l,j}^{(k)}\|} \quad \text{[Equation 3]}$$

In Equation 3, when a condition, for example, $\delta_{l,j} \leq \epsilon$, is satisfied, a sum of interference power of a candidate user terminal (l*,j*) having a minimum $\delta_{l,j}$ may be adopted. Here, "$\epsilon$" denotes reference power. As an additional condition, a number of selected user terminals associated with a communication device to which the candidate user terminal (l*,j*) belongs is required to be less than "N," because a high transmission sum rate may be achieved in a high signal-to-noise ratio (SNR) region when the number of the selected user terminals receiving a communication service from the communication device is maintained to be less than or equal to N.

When a portion of candidate user terminals is converted to a new selected user terminal through the described process of updating a selected user terminal, the k-th communication device 206 may receive a message from the final user group $S_k$ including the existing selected user terminals and the new selected user terminal through zero-forcing decoding.

Here, $\{S_k\}_{k \in [1:M]}$ is assumed to be the final user group $S_k$ including the selected user terminal updated through the algorithm described in the foregoing. That is, when the existing selected user terminals continuously receiving the communication service from the k-th communication device 206 and the selected user terminal receiving the communication service terminate the communication service, the final user group $S_k$ may include a candidate user terminal to which the communication service is to be provided in place of the selected user terminal. The candidate user terminal may be converted to a selected user terminal because the candidate user terminal may receive the communication service from the k-th communication device 206. That is, the process of updating a selected user terminal may be a process of determining a candidate user terminal to be included in a user group including a selected user terminal.

Here, $\{S_k\}_{k \in [1:M]}$ is assumed to be the final user group $S_k$ updated through the suggested algorithm. A signal to be received by the k-th communication device 206 from the final user group $S_k$ may be expressed as Equation 4.

$$y^{(k)} = \sum_{l=1}^{M} \sum_{j \in S_l} h_{l,j}^{(k)} x_{l,j} + z^{(k)} \qquad \text{[Equation 4]}$$
$$= \sum_{l=1}^{M} H_l^{(k)} x_l + z^{(k)}$$

In Equation 4, a channel matrix "N×|$S_l$|" is determined by $H_l^{(k)} = [h_{l,j}^{(k)}, \ldots, h_{l,|S_l|}^{(k)}]$. A transmission signal vector "|$S_l$|×1" is determined by $$x_l = \begin{bmatrix} x_{l,1} \\ \vdots \\ x_{l,|S_l|} \end{bmatrix}.$$

A zero-forcing matrix may be defined as Equation 5.

$$G_{ZF}^{(k)} = \begin{bmatrix} g_{ZF,1}^{(k)} \\ \vdots \\ g_{ZF,|S_l|}^{(k)} \end{bmatrix} = \left( H_l^{(k)*} H_l^{(k)} \right)^{-1} H_l^{(k)*} \qquad \text{[Equation 5]}$$

A message received by the k-th communication device 206 from the selected user terminal (k,i) 204 included in the final user group $S_k$ based on the zero-forcing matrix may be expressed as Equation 6.

$$g_{ZF,i}^{(k)} y^{(k)} = x_{k,i} + \sum_{l=1}^{M} \sum_{j \in S_l, j \neq i} g_{ZF,i}^{(k)} h_{l,j}^{(k)} x_{l,j} + g_{ZF,i}^{(k)} z^{(k)} \qquad \text{[Equation 6]}$$

A transmission rate of the selected user terminal (k,i) 204 may be expressed as Equation 7.

$$r_{k,i} = \log\left(1 + \frac{P}{\|g_{ZF,i}^{(k)}\|^2 + \sum_{l=1}^{M} \sum_{j \in S_l, j \neq i} |g_{ZF,i}^{(k)} h_{l,j}^{(k)}|^2 P}\right) \qquad \text{[Equation 7]}$$

A transmission sum, which is a sum of transmission rates of all selected user terminals included in the final user group $S_k$, may be expressed as Equation 8.

$$r_{sum} = \sum_{k=1}^{M} \sum_{i \in S_k} r_{k,i} = \qquad \text{[Equation 8]}$$
$$\sum_{k=1}^{M} \sum_{i \in S_k} \log\left(1 + \frac{P}{\|g_{ZF,i}^{(k)}\|^2 + \sum_{l=1}^{M} \sum_{j \in S_l, j \neq i} |g_{ZF,i}^{(k)} h_{l,j}^{(k)}|^2 P}\right)$$

A case in which a user terminal has a single transmitting antenna is described in the foregoing. Hereinafter, a case in which a user terminal has at least two transmitting antennas will be described. Here, a communication device may be only aware of local channel information, and a selected user terminal and a candidate user terminal associated with the communication device may not be aware of any types of channel information.

When a selected user terminal has L transmitting antennas, a signal to be received by the k-th communication device 206 may be expressed as Equation 9.

$$y^{(k)} = \sum_{l=1}^{M} \sum_{j \in A_l} H_{l,j}^{(k)} x_{l,j} + \sum_{l=1}^{M} \sum_{j \in B_l} G_{l,j}^{(k)} \bar{x}_{l,j} + z^{(k)} \qquad \text{[Equation 9]}$$

In Equation 9, "$H_{l,j}^{(k)}$" denotes an N×L channel vector from the selected user terminal (l,j) 209 to the k-th communication device 206, and "$G_{l,j}^{(k)}$" denotes an N×L channel vector from the candidate user terminal (l,j) 210 to the k-th communication device 206. "$x_{l,j}$" and "$\bar{x}_{l,j}$" denote an L×1 transmission signal vector of the selected user terminal (l,j) 209 and an L×1 transmission signal vector of the candidate user terminal (l,j) 210, respectively. "$z^{(k)}$" denotes an N×1 noise vector of $AP^k$.

In such a case, the selected user terminals may not be aware of any types of channel information and thus, transmission through beam forming using the channel information may not be possible. Thus, the selected user terminals may use a codebook-based beamforming method.

Here, a codebook including Q transmitting beam vectors is defined as $V = \{v(q)\}_{q \in [kQ]}$. When a transmitting beam vector of the selected user terminal (l,j) 209 is $v_{l,j} \in V$ and a transmitting beam vector of the candidate user terminal (l,j) 210 is $w_{l,j} \in V$, a signal vector to be received by the k-th communication device 206 may be expressed as Equation 10.

$$y^{(k)} = \sum_{l=1}^{M} \sum_{j \in A_l} H_{l,j}^{(k)} v_{l,j} x_{l,j} + \sum_{l=1}^{M} \sum_{j \in B_l} G_{l,j}^{(k)} w_{l,j} \bar{x}_{l,j} + z^{(k)} \qquad \text{[Equation 10]}$$

Equation 3 determined in the case of the single antenna may be converted to Equation 11 based on Equation 10.

$$\theta_{l,j}^{(k,i)}(q) = \frac{(H_{k,i}^{(k)}v_{k,i})^* G_{l,j}^{(k)}v(q)}{\|H_{k,i}^{(k)}v_{k,i}\|\|G_{l,j}^{(k)}v(q)\|} \quad \text{[Equation 11]}$$

Thus, when the candidate user terminal (l,j) 210 uses a q-th transmitting beam vector, $\theta_{l,j}^{(k,i)}(q)$ may be defined as an angle between a channel from the selected user terminal (k,i) 204 to the k-th communication device 206 and a channel from the candidate user terminal (l,j) 210 to the k-th communication device 206. The final user group $\{S_k\}_{k \in [1:M]}$ may be updated based on the angle.

Figure 3:
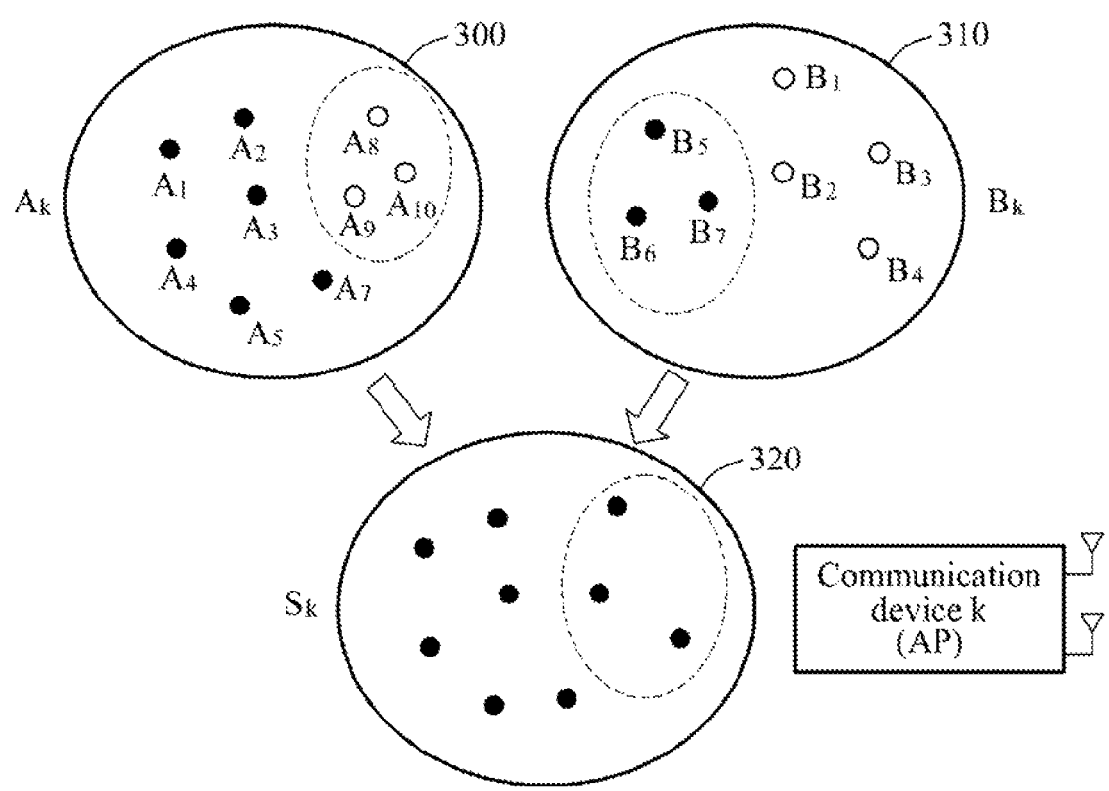
FIG. 3 illustrates an example process of determining a final user group by updating a selected user terminal according to an embodiment of the present invention.

FIG. 3 illustrates an example process of determining a final user group by updating a selected user terminal according to an embodiment of the present invention.

FIG. 3 illustrates a user group $A_k$ 300 including selected user terminals currently receiving a communication service from a k-th communication device, and a user group $B_k$ 310 including candidate user terminals belonging to a cell coverage area of the k-th communication device and currently not receiving the communication service from the k-th communication device.

Referring to FIG. 3, the user group $A_k$ 300 including the selected user terminals to which the communication service is provided by the k-th communication device in each transmission slot may be updated. The updated user group $A_k$ 300 may become a final user group $S_k$ 320 including the selected user terminals receiving the communication service from the k-th communication device in a current transmission slot.

For example, in the user group $A_k$ 300, a selected user terminal A8, a selected user terminal A9 and a selected user terminal A10 are assumed to terminate the communication service and return a wireless resource. A control apparatus may verify interference information of each candidate user terminal affecting the selected user terminals, in the user group $B_k$ 310. Here, the control apparatus may select a candidate user terminal B5, a candidate user terminal B6, and a candidate user terminal B7 having interference information less than reference information, and update the candidate user terminals B5, B6, and B7 to be new selected user terminals in place of the selected user terminals A8, A9, and A10.

The control apparatus may update the new selected user terminals B5, B6, and B7, excluding the selected user terminals A8, A9, and A10 from the user group $A_k$ 300, and determine the final user group $S_k$ 320 including the selected user terminals receiving the communication service from the k-th communication device.

According to an example embodiment, a portion of the selected user terminals may be updated. The control apparatus may determine, to be a selected user terminal, a portion of the candidate user terminals in the user group $B_k$ 310 including the candidate user terminals, and determine the final user group $S_k$ 320 by adding the determined selected user terminals to the existing user group $A_k$ 300.

Here, the control apparatus may determine a candidate user terminal to be converted to a selected user terminal among the candidate user terminals included in the user group $B_k$ 310 to maximize a transmission sum. According to an example embodiment, a direct exchange of channel information among communication devices may not be required.

Figure 4:
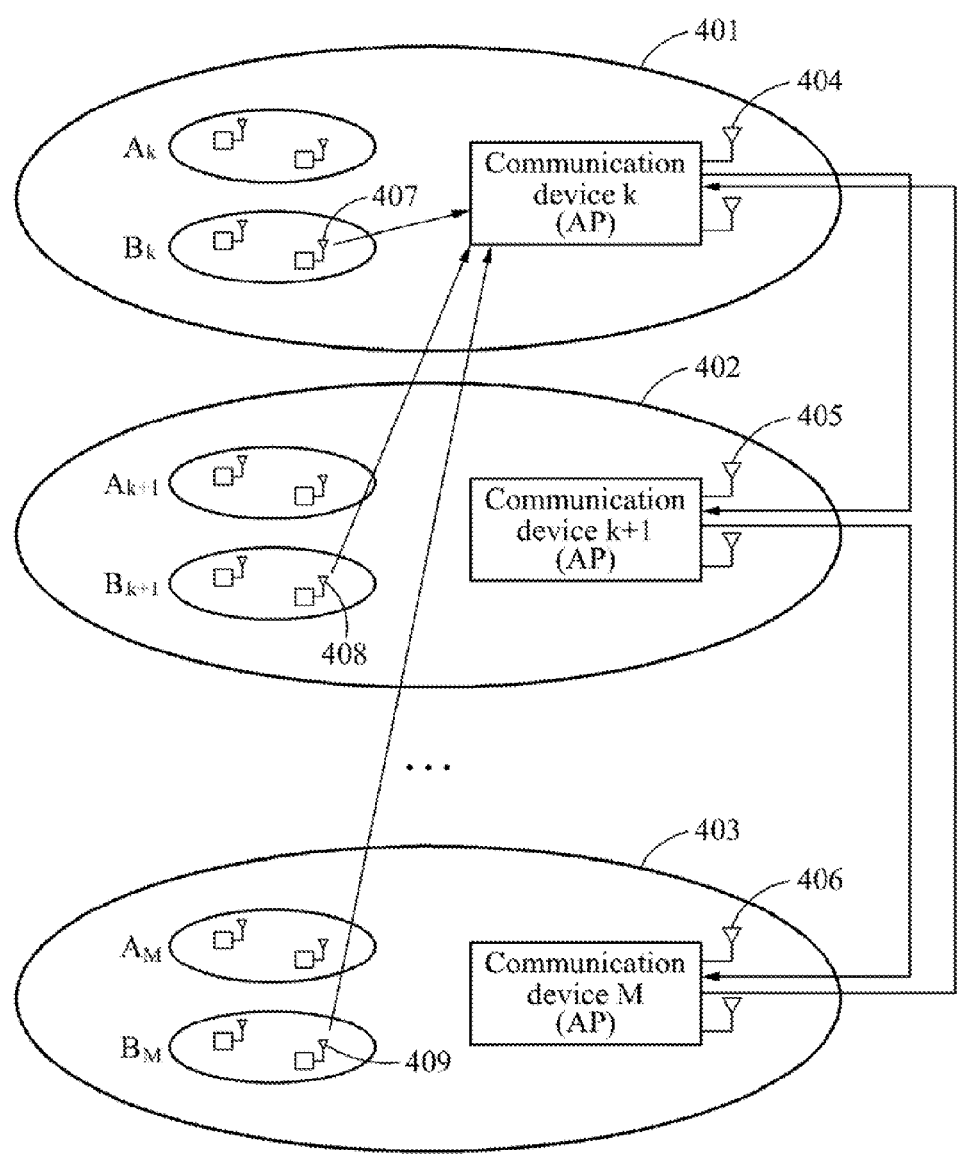
FIG. 4 illustrates an example process of updating a selected user terminal without exchanging channel information among communication devices according to an embodiment of the present invention.

FIG. 4 illustrates an example process of updating a selected user terminal without exchanging channel information among communication devices according to an embodiment of the present invention.

As described in the foregoing, in dynamically applied OIA, a selected user terminal or a candidate user terminal may not directly obtain channel information. In addition, a communication device may perform OIA only using local channel information.

Since channel information associated with all user terminals belonging to a WLAN environment is not readily obtained when the communication device is an access point, the OIA may be applied only using limited channel information in an environment to which dynamic multiple cells are applied.

In addition, in the dynamically applied OIA, partially updating a selected user terminal may be implemented without channel information being directly exchanged among access points which are communication devices.

Referring to FIG. 4, a k-th communication device 404 receives a partially calculated $\{\delta_{l,j}\}_{l=[1:M], j \in B_j}$ from a preceding k−1th communication device through a backhaul channel. Here, an initial value of $\delta_{l,j}$ may be set as 0. The k-th communication device 404 may update $\{\delta_{l,j}\}_{l=[1:M], j \in B_j}$ as expressed in Equation 12.

$$\delta_{l,j} \rightarrow \delta_{l,j} + \sum_{i \in S_k} |\theta_{l,j}^{(k,i)}| \quad \text{[Equation 12]}$$

That is, the k-th communication device 404 may update interference affecting the k-th communication device 404 by adding only local channel information associated with the k-th communication device 404 to the previously generated $\delta_{l,j}$. The k-th communication device 404 may transmit the updated $\{\delta_{l,j}\}_{l=[1:M], j \in B_j}$ to a subsequent k+1th communication device 405 through a backhaul channel.

When the process is performed by all the communication devices, a last M-th communication device 406 may determine $\{\delta_{l,j}\}_{l=[1:M], j \in B_j}$. The M-th communication device 406 may update a selected user terminal using the determined $\{\delta_{l,j}\}_{l=[1:M], j \in B_j}$.

Subsequently, the M-th communication device 406 may notify all the communication devices of information associated with the newly updated selected user terminal through a backhaul channel. The communication devices may then register the updated selected user terminal.

In addition, when a communication device transmits $\{\delta_{l,j}\}_{l=[1:M], j \in B_j}$ to a subsequent communication device, a candidate user terminal which may not have a probability of being selected may be dropped from the process. For example, a candidate user terminal desiring to receive a communication service from a communication device from which N selected user terminals already receive the communication service, or a candidate user terminal of which interference information $\delta_{l,j}$ exceeds a reference value $\epsilon$ may be dropped in the middle of the process. Through the dropping, each communication device may effectively calculate $\{\delta_{l,j}\}_{l=[1:M], j \in B_j}$ to be transmitted through a backhaul channel.

Figure 5:
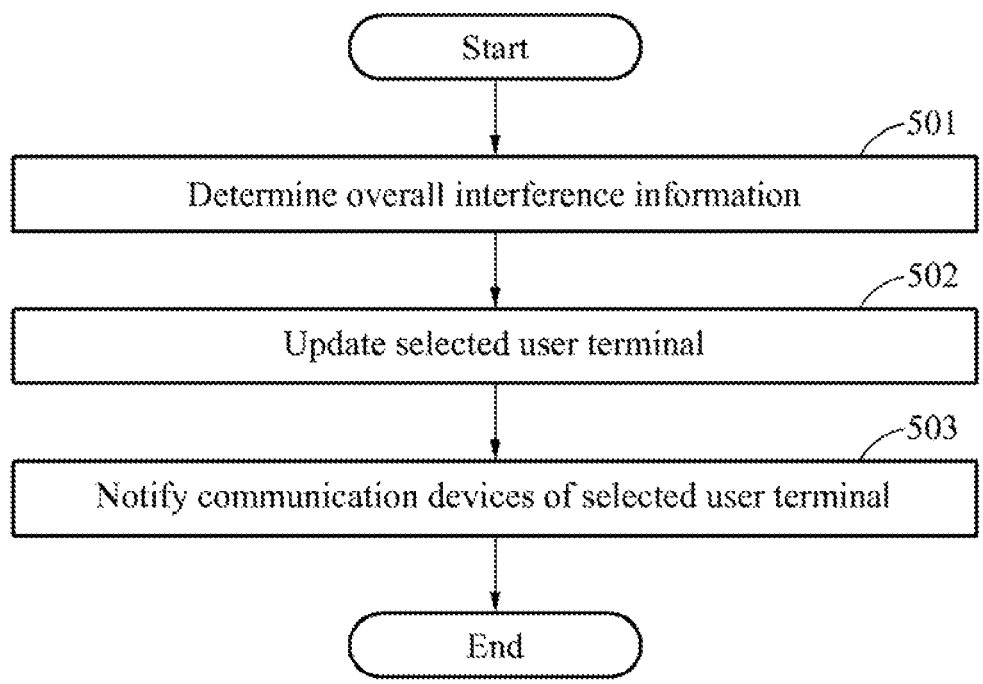
FIG. 5 is a flowchart illustrating a method of providing a communication service according to another embodiment of the present invention.

FIG. 5 is a flowchart illustrating a method of providing a communication service according to another embodiment of the present invention.

Referring to FIG. 5, in operation 501, a control apparatus determines overall interference information associated with a plurality of communication devices belonging to a cell coverage area. The overall interference information may be determined based on interference information partially updated by each communication device belonging to the cell coverage area.

For example, a k-th communication device among the communication devices may update interference information associated with the k-th communication device onto interference information associated with a k−1th communication device, and transmit the updated interference information to a k+1th communication device.

The interference information associated with the k-th communication device may be determined based on channel information between a candidate user terminal associated with the k-th communication device and the k-th communication device, and channel information between a selected user terminal associated with the k-th communication device and the k-th communication device.

In operation 502, the control apparatus updates a selected user terminal to which a communication service is to be provided by each communication device based on the overall interference information.

In operation 503, the control apparatus notifies the communication devices of the updated selected user terminal.

Figure 6:
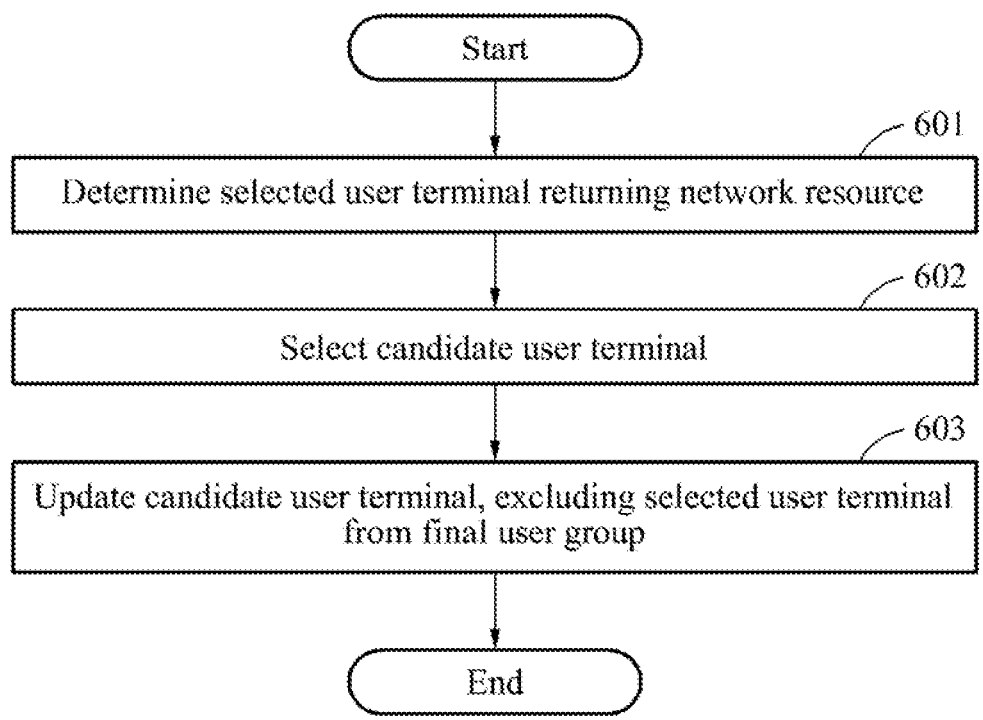
FIG. 6 is a flowchart illustrating a method of providing a communication service according to still another embodiment of the present invention.

FIG. 6 is a flowchart illustrating a method of providing a communication service according to still another embodiment of the present invention.

Referring to FIG. 6, in operation 601, a control apparatus determines a selected user terminal terminating a communication service received from a communication device belonging to a cell coverage area and returning a network resource.

In operation 602, the control apparatus selects, form a plurality of candidate user terminals, at least one candidate user terminal based on interference information affecting the selected user terminal.

In operation 603, the control apparatus updates the selected candidate user terminal, excluding the selected user terminal from a final user group to which the communication service is to be provided by the communication device. That is, the control apparatus may determine a final selected user terminal to which the communication service is to be provided by the communication device by updating, among the candidate user terminals, candidate user terminals of which interference information does not exceed a reference value to be new selected user terminals, excluding the selected user terminal terminating the communication service among existing selected user terminals.

Figure 7:
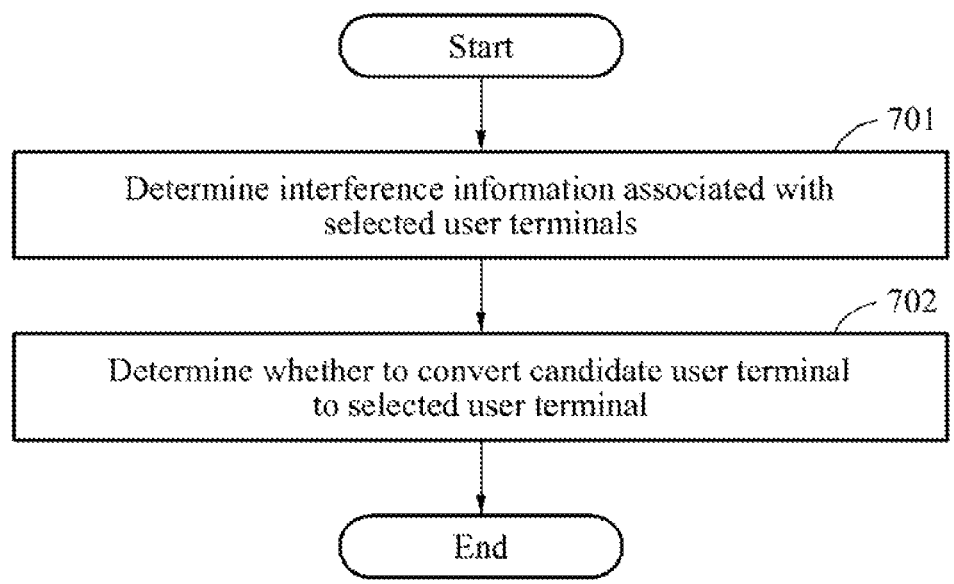
FIG. 7 is a flowchart illustrating a method of providing a communication service according to yet another embodiment of the present invention.

FIG. 7 is a flowchart illustrating a method of providing a communication service according to yet another embodiment of the present invention.

Referring to FIG. 7, in operation 701, a control apparatus determines interference information of each candidate user terminal desiring to receive a communication service from a communication device belonging to a cell coverage area, which affects selected user terminals receiving the communication service.

In operation 702, the control apparatus determines whether to convert the candidate user terminals to a selected user terminal based on the interference information of candidate user terminals.

Here, when interference information of a candidate user terminal does not exceed a reference value, the candidate user terminal may be converted to a selected user terminal. However, when the communication device already provides the communication service to N selected user terminals, the candidate user terminal may not be converted to the selected user terminal although the interference information of the candidate user terminal does not exceed the reference value.

FIG. 8 is an algorithm illustrating a process of converting a candidate user terminal having a single antenna to a selected user terminal according to an embodiment of the present invention.

FIG. 8 illustrates an example process of converting a portion of candidate user terminals having a single antenna to a selected user terminal and updating a selected user terminal to which a communication service is to be provided by a communication device. The description provided with reference to FIG. 2 may be applicable hereto and thus, detailed descriptions will be omitted here.

FIG. 9 is an algorithm illustrating a process of converting a candidate user terminal having multiple antennas to a selected user terminal according to an embodiment of the present invention.

FIG. 9 illustrates an example process of converting a portion of candidate user terminals having multiple antennas to a selected user terminal and updating a selected user terminal to which a communication service is to be provided by a communication device. The description provided with reference to FIG. 2 may be applicable hereto and thus, detailed descriptions will be omitted here.

Figure 10:
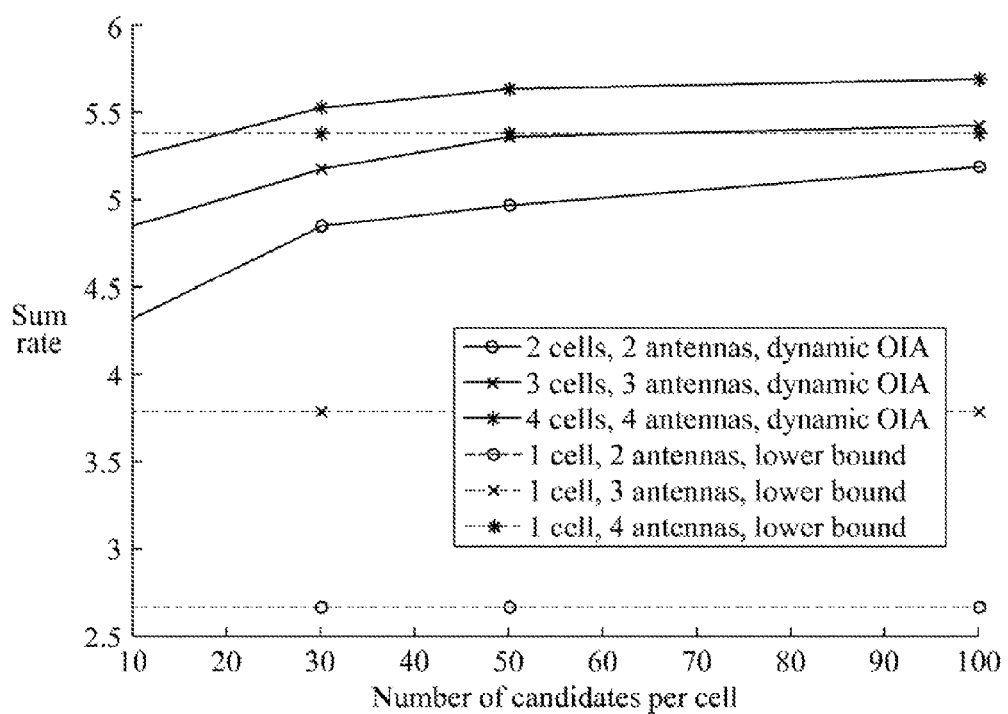
FIG. 10 is a graph illustrating a transmission sum rate based on a number of candidate user terminals per cell coverage in a case of a signal-to-noise ratio (SNR) being 5 decibels (dB) according to an embodiment of the present invention.

FIG. 10 is a graph illustrating a transmission sum rate based on a number of candidate user terminals per cell coverage in a case of an SNR being 5 decibels (dB) according to an embodiment of the present invention.

The grape illustrated in FIG. 10 indicates a result of simulating a dynamic OIA. For the simulation, reference information in which a transmission sum becomes a maximum is set as $\epsilon$, with respect to interference information.

TABLE 1

| Parameter | Value |
| --- | --- |
| Number of candidates per cell | 10, 30, 50, 100 |
| Number of APs | 2, 3, 4 |
| Number of AP antennas | 2, 3, 4 |
| Probability of service termination | 0.5 |

To verify efficiency through OIA in multiple cells, a transmission sum rate when a multiple antenna method in a single cell is applied is also considered.

Referring to FIG. 10, when the OIA is performed in the multiple cells, a transmission sum rate by the OIA is verified to be high compared to the case of the single cell, despite a lower number of candidate user terminals per cell. When two cells are present, a transmission sum rate may be improved by approximately 65% compared to the case of the single cell, through securing of only 10 as the number of candidate user terminals per cell.

Figure 11:
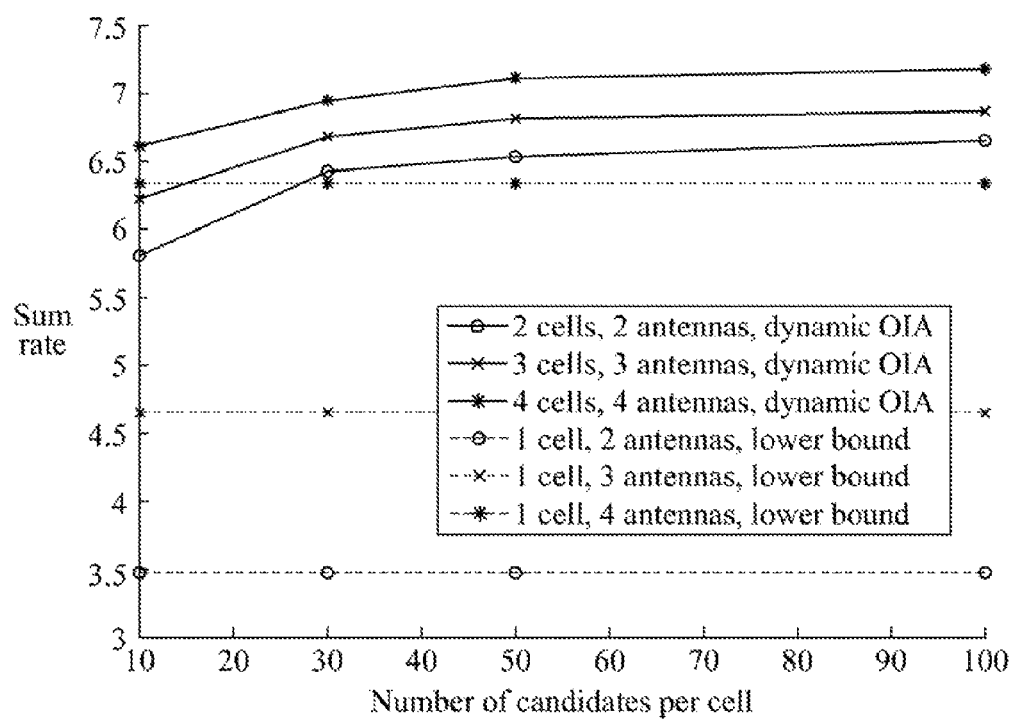
FIG. 11 is a graph illustrating a transmission sum rate based on a number of candidate user terminals per cell coverage in a case of an SNR being 10 dB according to an embodiment of the present invention.

FIG. 11 is a graph illustrating a transmission sum rate based on a number of candidate user terminals per cell coverage in a case of an SNR being 10 dB according to an embodiment of the present invention.

Dissimilar to FIG. 10, FIG. 11 illustrates a transmission sum rate based on a number of candidate user terminals per cell, when an SNR is 10 dB. To verify efficiency through OIA in multiple cells, a transmission sum rate when a multiple antenna method in a single cell is applied is also considered.

Referring to FIG. 11, when a number of cells increases, a relatively greater number of candidate user terminals may be required to be secured, compared to the case of the single cell. However, when the OIA is applied, a gain of a transmission sum rate may be obtained only with a lower number of candidate user terminals, for example, 10 to 30, and thus, simultaneously applying the multiple cells may be more effective.

When two cells are present, a transmission sum rate may be improved by approximately 65% compared to the case of the single cell, through securing of only 10 as the number of candidate user terminals per cell.

According to example embodiments, a calculation complexity in determining a selected user terminal may be reduced through partial updating of a new selected user terminal to which a communication service is to be provided by a communication device in each transmission slot.

According to example embodiments, a high transmission sum rate may be achieved in a high SNR region through maintenance of a predetermined number of selected user terminals to be finally determined in association with a communication device.

According to example embodiments, a quality of a communication service may be maintained through updating, to be a selected user terminal, candidate user terminals having a lower degree of interference with a selected user terminal receiving the communication service from a communication device, compared to a reference value.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of providing a communication service performed by a control apparatus, the method comprising:
   determining a first user group comprising a selected user terminal to which a communication service is provided by a communication device belonging to a cell coverage area;
   determining a second user group comprising at least one candidate user terminal selected from a plurality of candidate user terminals based on interference information affecting the selected user terminal; and
   determining the first user group and the second user group to be a final user group to which the communication service is to be provided by the communication device,
   wherein the interference information is determined based on first channel information between the candidate user terminal and the communication device and second channel information between the selected user terminal and the communication device, and
   wherein, when the candidate user terminal has one or more transmitting antennas, the interference information is determined based on an angle between a first channel vector from the candidate user terminal to the communication device, for each of the one or more transmitting antennas of the candidate user terminal, and a second channel vector from the selected user terminal to the communication device.

2. The method of claim 1, wherein the determining of the second user group comprises:
   determining the second user group allowing the interference information to be less than preset reference information and the final user group to maintain terminals less than or equal to a preset number of terminals.

3. A method of providing a communication service performed by a control apparatus, the method comprising:
   determining overall interference information associated with a plurality of communication devices belonging to a cell coverage area;
   updating a selected user terminal to which a communication service is to be provided by each of the communication devices based on the overall interference information; and notifying each of the communication devices of the updated selected user terminal, and wherein the overall interference information is determined based on interference information partially updated by each of the communication devices belonging to the cell coverage area, wherein interference information associated with a k-th communication device among the communication devices is determined based on first channel information between a candidate user terminal associated with the k-th communication device and the k-th communication device, and second channel information between a selected user terminal associated with the k-th communication device and the k-th communication device, and wherein, when the candidate user terminal has one or more transmitting antennas, the interference information associated with the k-th communication device is determined based on an angle between a first channel vector from the candidate user terminal to the k-th communication device, for each of the one or more transmitting antennas of the candidate user terminal, and a second channel vector from the selected user terminal associated with the k-th communication device to the k-th communication device.

4. The method of claim 3, wherein the k-th communication device is configured to update interference information associated with the k-th communication device onto interference information associated with a (k−1)-th communication device and transmit the updated interference information to a (k+1)-th communication device.

5. A control apparatus performing a method of providing a communication service, the control apparatus comprising:

a first determiner configured to determine a first user group comprising a selected user terminal to which a communication service is provided by a communication device belonging to a cell coverage area;

a second determiner configured to determine a second user group comprising at least one candidate user terminal selected from a plurality of candidate user terminals based on interference information affecting the selected user terminal; and a third determiner configured to determine the first user group and the second user group to be a final user group to which the communication service is to be provided by the communication device, wherein the interference information is determined based on first channel information between the candidate user terminal and the communication device and second channel information between the selected user terminal and the communication device, and wherein, when the candidate user terminal has one or more transmitting antennas, the interference information is determined based on an angle between a first channel vector from the candidate user terminal to the communication device, for each of the one or more transmitting antennas of the candidate user terminal, and a second channel vector from the selected user terminal to the communication device.

6. The control apparatus of claim 5, wherein the second determiner is configured to determine the second user group allowing the interference information to be less than preset reference information and the final user group to maintain terminals less than or equal to a preset number of terminals.

* * * * *